United States Patent [19]
Tanaka et al.

[11] Patent Number: 5,258,089
[45] Date of Patent: Nov. 2, 1993

[54] METHOD FOR PRODUCING INTERIOR-FINISHING MATERIAL FOR USE IN AUTOMOBILES

[75] Inventors: Rikizou Tanaka, Ohtsu; Hisasi Nakasima, Tochigi; Hiroshi Takahashi, Saitama; Tatuo Sakamoto; Tsugumi Sanmiya, both of Toyota; Kazuo Ito, Toyoake, all of Japan

[73] Assignees: Sekisui Kagaku Kogyo Kabushiki Kaisha, Osaka; Toyota Jidosha Kabushiki Kaisha, Aichi, both of Japan

[21] Appl. No.: 773,785

[22] Filed: Oct. 11, 1991

Related U.S. Application Data
[63] Continuation of Ser. No. 389,712, Aug. 4, 1989, abandoned.

Foreign Application Priority Data
Aug. 5, 1988 [JP] Japan .................. 63-196406

[51] Int. Cl.$^5$ .................. B32B 7/14; B32B 17/04
[52] U.S. Cl. .................. 156/324.4; 156/291; 156/83; 264/45.4; 264/DIG. 6; 427/208.2; 427/286
[58] Field of Search ............ 156/62.2, 83, 315, 324.4, 156/224, 291, 307.5, 307.3; 427/208.2, 208.6, 286; 264/45.4, DIG. 6

[56] References Cited

U.S. PATENT DOCUMENTS
| | | | |
|---|---|---|---|
| 3,383,272 | 5/1968 | Gluck | 156/224 |
| 4,743,488 | 5/1988 | Jones et al. | 156/291 X |
| 4,836,871 | 6/1989 | Kato | 264/45.4 |
| 4,923,547 | 5/1990 | Yamaji et al. | 156/62.2 |

FOREIGN PATENT DOCUMENTS
| | | | |
|---|---|---|---|
| 2046650 | 3/1971 | Fed. Rep. of Germany | 264/45.4 |
| 0009254 | 1/1984 | Japan | 264/45.4 |

Primary Examiner—Michael W. Ball
Assistant Examiner—Francis J. Lorin
Attorney, Agent, or Firm—Nikaido, Marmelstein, Murray & Oram

[57] ABSTRACT

An interior-finishing material for use in automobiles including a substrate made of a needled glass-fiber sheet containing a thermoplastic resin binder, with the said needled glass-fiber sheet being mainly composed of glass fiber, a heat-fusible adhesive layer with air permeability disposed on the substrate, and a surface layer with air permeability disposed on the adhesive layer, and the substrate further contains expanded microbeads.

6 Claims, 2 Drawing Sheets

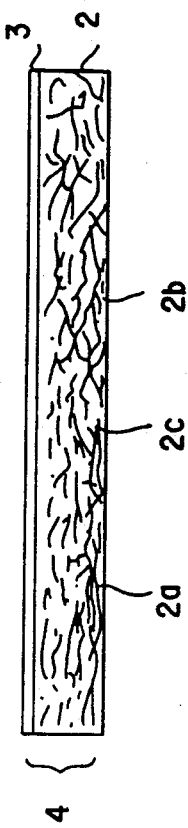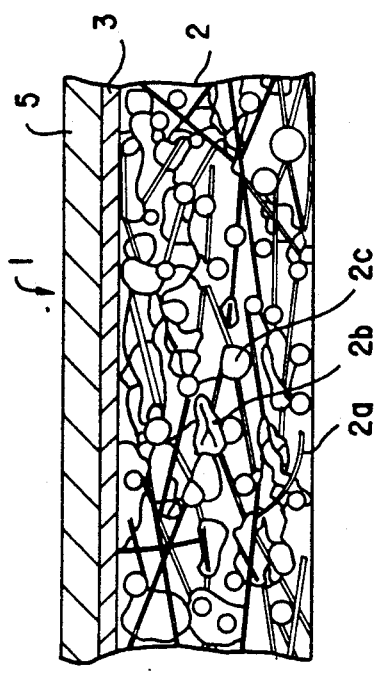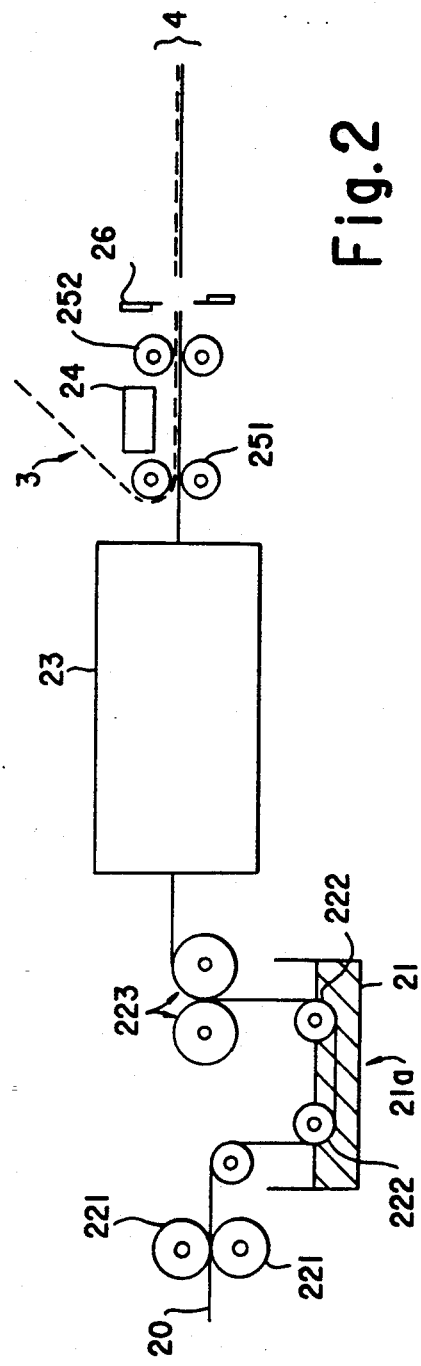

METHOD FOR PRODUCING INTERIOR-FINISHING MATERIAL FOR USE IN AUTOMOBILES

This application is a continuation of application Ser. No. 389,712 filed Aug. 4, 1989, now abandoned.

BACKGROUND OF THE INVENTION

1. Field of the Invention

The present invention relates to an interior-finishing material for use in automobiles, such as for headlinings, doors, or the like. More specifically, the present invention relates to an interior-finishing material that can be readily produced by the one-piece molding method, and that has excellent sound absorbing characteristics, resistance to deformation against heat, and moldability. Furthermore, the present invention relates to a method for producing an interior-finishing material for use in automobiles having the above-mentioned excellent properties.

2. Description of the Prior Art

Various interior-finishing materials for use in automobiles, such as headlinings, etc., have long been proposed and produced. Japanese Patent Publication No. 62-20003, for instance, discloses the following method for producing an interior-finishing material. First, fibers are bound with a thermoplastic resin or a mixture of a thermoplastic resin and a thermosetting resin, resulting in a sheet. The sheet (i.e., the substrate) is preheated to about 120° C. and a surface material is attached thereon via a layer of a thermosetting adhesive that can be cured at a temperature of up to 120° C., and the laminate is treated by cold compression molding. In this method, the substrate is heated at a relatively low temperature such as about 120° C. so that the surface material does not deteriorate, as it would at high temperatures. However, the thermoplastic resin serving as a binder fails to melt thoroughly at such a low temperature. Therefore, the bindings between the fibers are not released satisfactorily. When the heated substrate is compression-molded, stress caused by the deformation of the substrate remains. Accordingly, when the molded article is kept at a high temperature, the molded article tends to return to its original shape. In this method, an adhesive layer is provided that is curable at the relatively low temperature of up to 120° C. to help prevent deformation of the molded article caused by residual stress. However, the adhesive layer is very thin compared with the thickness of the substrate, resulting in insufficient prevention against the aforementioned deformation. When the thermosetting resin is incorporated into the substrate, the degree of the deformation is less than that of the substrate that contains only the thermoplastic resin. But even when the thermosetting resin is incorporated, a sufficient effect cannot be obtained. In particular, when the substrate is thick, the stress that arises in the substrate becomes large, resulting in more deformation.

Furthermore, in the method mentioned above, as the thermoplastic resin serving as a binder does not melt completely, the substrate is molded with the fibers being bound with the binder. When the substrate is press-molded, the flowability of the fibers is poor that compose the substrate is poor; that is, the fibers do not move easily. Therefore, it is difficult for the substrate to be accurately formed into the shape of a mold, and thus, greater pressure is needed for molding. Thus, the method has a drawback in that the molding process cannot be performed with accuracy.

SUMMARY OF THE INVENTION

The interior-finishing material for use in automobiles of this invention, which overcomes the above-discussed and numerous other disadvantages and deficiencies of the prior art, comprises a substrate made of a needled glass-fiber sheet containing a thermoplastic resin binder, a heat-fusible adhesive layer with air permeability disposed on said substrate, and a surface layer with air permeability disposed on said adhesive layer, wherein said substrate further contains expanded microbeads.

The expanded microbeads are formed by subjecting expandable microbeads to a heating treatment.

The method for producing an interior-finishing material for use in automobiles comprises the steps of: providing a needled glass-fiber sheet mainly composed of glass fiber; dispersing a thermoplastic resin binder and expandable microbeads into a needled glass-fiber sheet to obtain a substrate; forming a heat-fusible adhesive layer with air permeability on the surface of said substrate; heating the two-layered laminate thus obtained to expand said expandable microbeads and to melt said heat-fusible adhesive; placing a surface material with air permeability on the surface of said adhesive layer; and subjecting the three-layered laminate thus obtained to cold compression molding.

In a preferred embodiment, the expandable microbeads are particles of thermoplastic resin containing an expanding agent.

In a preferred embodiment, the thermoplastic resin binder is contained in an amount of from 20 to 80 parts by weight for every 100 parts by weight of said glass-fiber sheet, and said expandable microbeads are contained in an amount of from 2 to 50 parts by weight for every 100 parts by weight of said thermoplastic resin binder.

In a preferred embodiment, the needled glass-fiber sheet further contains organic fibers.

Thus, the invention described herein makes possible the objectives of (1) providing an interior-finishing material for use in automobiles that is free from deformation when it is heated and has excellent sound absorbing characteristics; (2) providing a method for readily producing an interior-finishing material for use in automobiles that has the above-mentioned excellent properties; and (3) providing a method for producing an interior-finishing material for use in automobiles that has above-mentioned excellent properties by simultaneous cold compression molding of a surface material and a substrate.

BRIEF DESCRIPTION OF THE DRAWINGS

This invention may be better understood and its numerous objects and advantages will become apparent to those skilled in the art by reference to the accompanying drawings as follows:

FIG. 1 is a cross-sectional view showing one example of the interior-finishing material for use in automobiles according to the present invention.

FIG. 2 is a diagram illustrating part of the manufacturing process for the interior-finishing material of the present invention.

FIG. 3 is a cross-sectional view of the laminate manufactured by the process of FIG. 2.

DESCRIPTION OF THE PREFERRED EMBODIMENTS

Figure 4:
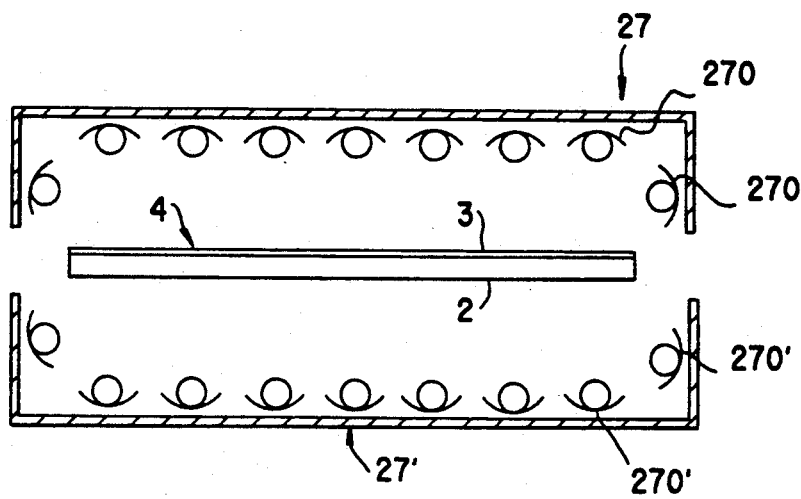
FIG. 4 is a cross-sectional view of a heating process for the laminate.

The glass-fiber sheet to be used for the present invention is made mainly of glass fibers and contains organic fibers when required. Examples of organic fibers include synthetic fibers such as polyester fiber, polyvinyl chloride fiber, polyethylene fiber, or the like; natural fibers such as cotton, linen, silk, or the like; and regenerated fibers such as rayon fiber or the like.

The glass-fiber sheet is obtained, for example, by needling of a glass-fiber mat. Alternatively, the glass-fiber sheet can be prepared as follows. First, at least one of the above-mentioned other fibers that was previously cut to suitable lengths is fibrillated and mixed with glass fibers to prepare a web. Then, the web is pressed by a roller and worked with needle punching. Needling can be effected by placing a thin nonwoven fabric on one side of the web or on both sides of the web.

The suitable glass fiber mentioned above is 5 to 15 $\mu$m and preferably 8 to 12 $\mu$m in diameter, and 2 to 20 cm in length. Fibers with a length of 4 to 8 cm are preferably distributed in the range of 50 to 90% of the glass fibers constituting the substrate. The preferred glass-fiber sheet obtained is 3 to 10 mm thick and weighs 200 to 1,000 g/m$^2$.

The above-mentioned organic fibers are preferably made of a polyester with a denier of 2 to 6 and a length of 2 to 20 cm. Polyester fibers with a length of 4 to 8 cm are preferably distributed in the range of 50 to 90% of the polyester fibers.

Examples of the material for the thermoplastic resin binder to be used for the present invention include acrylic resin (including acrylate resin), vinyl chloride resin, polystyrene resin, or the like. It is preferable to use at least two kinds of resins, including one resin that has a softening temperature of 100° C. or more. It is preferable to add a suitable amount of synthetic rubbers, such as SBR, NBR, etc., or of natural rubber to such resins. These rubbers provide the substrate with stiffness and toughness. The above thermoplastic resin binder is usually used in the form of an emulsion by being impregnated into the aforementioned glass-fiber sheet.

The resin binder is used in the amount of 20 to 80 parts by weight as solid content per 100 parts by weight of the glass-fiber sheet. When an excess amount of the resin binder is used, the interior-finishing material that is obtained has improved stiffness, but its sound absorbing property declines and the weight of the interior-finishing material increases. When less than 20 parts by weight of the resin binder is used, the stiffness of the interior-finishing material is poor.

The expandable microbeads to be used for the present invention are particles made of a thermoplastic resin that contains an expanding agent. For example, commercial expandable polystyrene microbeads can be used in which an expanding agent such as propane, butane, pentane petroleum ether, etc. is dispersed. Alternatively, thermal-expandable microcapsules made of vinylidene chloride copolymer or the like can be used in which a liquid expanding agent of a hydrocarbon that boils at low temperature (e.g., pentane, hexane, heptane, or the like) is contained. Useful expandable microbeads are those with a foam initiating temperature (i.e., the temperature at which expansion occurs) higher than t. temperature to be used for the drying step of the substrate that will be described later. Generally, microbeads with having a foam initiating temperature of 100° C. or more are used. These expandable microbeads are, as to be described later, mixed with the above-mentioned binder, which is in the form of an emulsion to be impregnated, and dispersed into a glass-fiber sheet. Expandable microbeads with an excessively large particle diameter have poor dispersibility. The diameter of the expandable microbeads is 200 $\mu$m or less, preferably 100 $\mu$m or less, and more preferably 20 to 30 $\mu$m. The expansion ratio of the expandable microbeads is preferably 40 to 80. It is desirable that the expandable microbeads are used in the amount of 2 to 50 parts by weight for every 100 parts by weight of the thermoplastic resin binder. When a smaller amount of the expandable microbeads is used, the moldability of the substrate is poor, and the molded article thus obtained tends to be deformed at high temperatures. When an excess amount of the expandable microbeads is used, the volume of the expanded substrate layer becomes too large, resulting in insufficient stiffness. Furthermore, expandable microbeads have the drawback of being expensive.

The above-mentioned binder and expandable microbeads are usually used in the form of an emulsion with a solid content of 10 to 60 percent by weight based on the combined amount thereof.

Examples of the heat-fusible adhesive to be used for the present invention can be those of conventional heat-fusible adhesives such as amide-type adhesive, and adhesive made of ethylene-vinylacetate copolymer, polyisobutylene, or the like. The melting temperature of such adhesives is from 85° to 130° C.

The surface material to be used for the present invention is a sheet with air-permeability, to consider sound-absorbing properties. Furthermore, in view of the desirability of a decorative effect and pleasant feeling to the touch, a nonwoven fabric or knit fabric is usually used. Especially preferred are sheets backed with air-permeable polyurethane foam or the like to provide cushioning properties.

To prepare the interior-finishing material for use in automobiles according to the present invention, for instance, the above-mentioned glass-fiber sheet is impregnated with an emulsion containing the above thermoplastic resin and expandable microbeads. The sheet can be impregnated with the emulsion by a coating method, spraying method, or dipping method. Most preferable is the dipping method. In this way, a substrate with a thermoplastic resin and expandable microbeads dispersed uniformly in the glass-fiber sheet can be obtained. For example, the substrate obtained by the above-mentioned dipping method is dried in a suitable way. The drying process can be a conventional drying process. For example, heating processes using hot air, infrared or far infrared rays, a gas burner, high-frequency heater, or the like can be used. Alternatively, the sheet can be dried by being brought into contact with heated rolls, a hot plate, etc. The above-mentioned drying process can be employed singly or in combination for a total of at least two processes. The drying temperature should be a temperature at which the expandable microbeads do not expand or a temperature at which the microbeads do not thoroughly expand even if they begin to expand somewhat.

Next, a heat-fusible adhesive is applied to the surface of the substrate that is obtained. For example, the adhesive is partially applied (i.e., in a striped or lattice pattern) by being sprayed on the surface of the substrate, so that the adhesive layer formed has overall air permeability. Usually, a commercially available heat-fusible adhesive in the form of a film with openings or in the form of a net is put on the substrate, heated, and pressed onto the substrate form an adhesive layer.

The heat-fusible adhesive is used preferably in the amount of 20 to 150 g and more preferably in the amount of 50 to 100 g, per 1 m² of the substrate. The amount of the adhesive can be increased or decreased according to the kind of materials and surface conditions of the substrate and the surface material.

In the substrate, the portions of the fibers (which are mainly glass fibers) that come into contact with each other are bound partially with the thermoplastic resin, so that the substrate has a continuous structure. Therefore, the substrate is provided with both stiffness and air-permeability. The heating and the molding steps to be discussed later can be readily carried out by use of a laminate that is composed of above-mentioned substrate and the heat-fusible adhesive.

The laminate of the substrate and the heat-fusible adhesive is heated in an oven. The heating temperature is such that the above expandable microbeads expand, the layer of the heat-fusible adhesive is thoroughly melted, and most of or all the thermoplastic resin binder is melted. Usually, the temperature is 140° to 190° C. It is desirable that the heating period should be from 25 to 90 minutes. The heated laminate is then removed from the oven, and a surface material is placed on the surface of the adhesive layer while the heat-fusible adhesive remains melted and cold compression molding is done. The compression molding can be carried out satisfactorily in tens of seconds. The heated substrate increases in thickness giving a greater volume by the expansion of the expandable microbeads, and the thermoplastic resin binder melts mostly or entirely. Accordingly, the mutual binding among the fibers is loosened or unbound, giving the fiber flowability. Furthermore, because the substrate increases in volume by expansion, the density of the substrate is lowered, resulting in further flowability of the fiber. The substrate is removed from the oven, and then the surface material is placed on the substrate, followed by cold compression-molding, so that the fiber moves easily along the shape of the mold, resulting in extremely good moldability.

The expandable microbeads that are contained in the substrate begin to expand when the laminate is heated in the oven. This expansion is not completed entirely in the oven, but proceeds until the cold compression molding process is ended and the molded article is removed from the mold. Therefore, even during the cold compression molding, the substrate expands in the direction of thickness, resulting in accurate shaping to the form of the mold. Molding, as a result, can be performed with excellent moldability because of pressure arising from the expansion of the microbeads, resulting in a molded article of an accurate thickness and shape even when the mold has a complicated shape or has minute irregular parts.

On the completion of the cold compression molding, the thermoplastic resin binder is again cooled and solidified, so that the fibers are bound to each other in a stable way so as to constitute a molded article. Accordingly, the stress that arises from deformation at the time of the press molding does not arise in this substrate. Therefore, the molded article obtained does not tend to return to its original shape when exposed to high temperatures. In other words, the molded article is excellent in heat resistance.

The expanded substrate layer of the molded article obtained increases in volume by virtue of expansion of the expandable microbeads, resulting in considerable thickness compared with an unexpandable sheet of equivalent weight. Consequently, the molded article has much stiffness.

In the present invention, only the laminate made of the substrate and the heat-fusible adhesive is heated as described above. Although the surface material is heated by contact with the melted adhesive, it is only the laminated surface that is heated, and the material is cooled immediately thereafter by cold compression. Thus, the heating does not cause changes in properties or shape.

The interior-finishing material prepared according to the present invention is as a whole air-permeable, excellent in sound-absorbing characteristics, and lightweight, and with stiffness caused by expansion of the expandable microbeads.

Because mutual binding among the fibers is lessened at the time of the compression-molding process, and as the expansion pressure allows the substrate to expand in the direction of thickness as well as to expand partially in the direction of the plane slightly, excellent moldability is obtained, so that molding can be performed accurately even with use of a mold of complicated shape or with minute irregular parts. The fibers are again bound to each other on completion of the molding, preventing any stress caused by the molding. Additionally, the fibers consisting mainly of glass fibers, reinforce the entire molded article. Thus, a interior-finishing material that is excellent in its resistance to deformation at high temperatures can be obtained. The interior-finishing material for use in automobiles that is prepared according to the present invention is suitable for use as headlinings or doors of automobiles.

The following description deals with one preferred embodiment of the present invention.

EXAMPLE

FIG. 2 illustrates equipment for the manufacture of a laminated sheet composed of a substrate and heat-fusible adhesive for the present invention. The equipment includes rollers 221 and 223 for transporting a continuous sheet, an emulsion tank 21 for impregnating the sheet with resin emulsion 21a containing expandable microbeads, a hot-air drying unit 23, an infrared heater 24, pressure rollers 252, and a cutter 26. Sheet guide rollers 222 are disposed in the emulsion tank 21 where a glass-fiber sheet 20 is impregnated with the emulsion 21a. The emulsion pickup is adjusted by rollers 223 disposed downstream of the emulsion tank 21. Disposed upstream of the heater 24 are rollers 251 for guiding a heat-fusible adhesive film 3. The heat-fusible adhesive film 3 is laminated on the upper surface of the glass-fiber sheet 20. When heated by the infrared heater 24, the adhesive film 3 melts, and the melted adhesive film 3 and the glass-fiber sheet 20 are pressed together by means of rollers 252. The laminated sheet thus produced is cut into a desired size using the cutter 26 moving vertically at regular intervals.

A laminated sheet was prepared by use of the above equipment. For the glass fiber sheet 20, a sheet prepared in the following way was used. First, 90 parts by weight of glass fibers (E glass; diameter, 9 μm; fiber length, 50–80 mm) and 10 parts by weight of polyester fibers (3 denier; fiber length, 50–80 mm) were combined to form a web. The web was then worked with needle punching using a No. 19 felt needle (needle threading density: 20 points/cm$^2$, needle through-length: 14 mm) to prepare a sheet about 6 mm thick and weighing 550 g/m$^2$. The emulsion 21a was prepared in the following way. First, 100 parts by weight of polystyrene resin emulsion (ULTRASOL, Takeda Chemical Industries Ltd.; solid content 50%), 20 parts by weight of an acrylic resin emulsion (ULTRASOL, Takeda Chemical Industries Ltd.; solid content 50%), 20 parts by weight of nitrile butadiene rubber (CROSLENE, Takeda Chemical Industries Ltd.) and 10 parts by weight of expandable microbeads (Microsphere, Matsumoto YushiSeiyaku Co., Ltd.; solid content 70%, maximum expansion ratio 70) were mixed, and by addition to the mixture of a proper amount of a viscosity modifier and water, an emulsion of 30% solid content was obtained.

The glass-fiber sheet 20 thus prepared in continuous form was impregnated with the emulsion 21a, and then passed between the rollers 223, the pickup of emulsion 21a in the glass-fiber sheet 20 being adjusted to approximately 350 g/m$^2$ in terms of solid matter. The sheet 20 was then dried at approximately 100° C. in the hot-air drying unit 23. In this drying process, the glass fibers of the glass-fiber sheet 20 were partially bound with thermoplastic resin binder. Next, the adhesive film 3 was laminated while being passed between the rollers 251 onto the surface of the glass-fiber sheet dried in this way and containing emulsion constituents. For the adhesive film 3, a net-like polyamide type heat-fusible adhesive (fusing temperature about 120° C., weight 50 g/m$^2$) was used. The adhesive film 3 was heated and softened by the infrared heater 24, and then pressed onto the glass-fiber sheet by means of the rollers 252. The sheet laminated in this way was cut with the cutter 26 to obtain a laminate 4 composed of the glass-fiber sheet containing emulsion constituents (i.e., substrate) 2 and the adhesive film 3. FIG. 3 shows a cross-sectional view of the laminate 4. The laminate 4 was about 4.0 mm thick and weighed 950 g/m$^2$.

Figure 5:
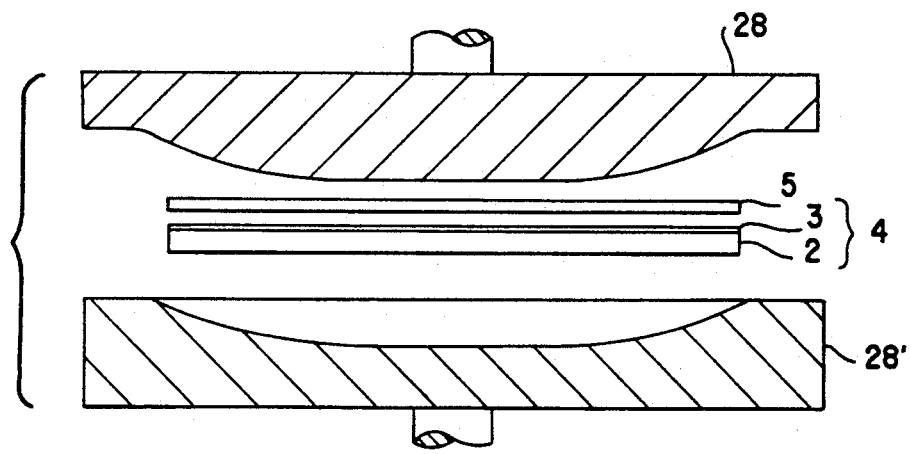
FIG. 5 is a cross-sectional view of a molding process.
Figure 6:
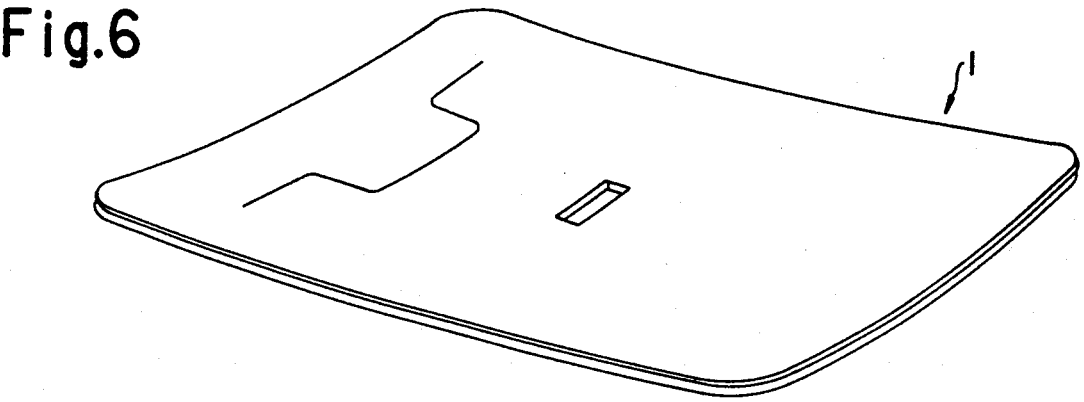
FIG. 6 is a perspective view of the formed interior-finishing material of the present invention.

Next, the laminate 4 was charged into the heating furnaces 27 and 27' shown in FIG. 4, each provided with a plurality of heaters either 270 or 271', and was heated to about 170° C. The press molding tools 28 and 28' shown in FIG. 5 were provided. A surface material 5 was superimposed on the heated laminate 4 with the layer of the adhesive film 3 in the laminate 4 facing the surface material, and clamp press molding was done with the press molding tools 28 and 28'. For the surface material, a sheet backed with a urethane foam sheet was used. The urethane foam sheet had an expansion ratio of 30 and a thickness of 3.0 mm. Press molding was performed for 30 seconds with the clamping pressure of 0.5–2.0 kg/cm$^2$, the mold temperature of 60° C., and the mold clearance of 6.0 mm. FIG. 6 shows a perspective view of an interior-finishing material 1 for use in automobiles formed by trimming after molding.

A cross-section of the interior-finishing material 1 formed thus is shown in FIG. 1. The interior-finishing material 1 has the substrate 2 containing expanded microbeads, the heat-fusible adhesive film 3 disposed on the substrate 2, and the surface material 5 disposed on the adhesive film 3. The glass fiber 2a is partially bound with the binder 2b, and expanded microbeads 2c are dispersed almost uniformly within the entire substrate layer.

Table 1 shows the kinds and quantities of the glass-fiber sheet, emulsion, and heat-fusible adhesive used for the preparation of the interior-finishing material; the weight, thickness, and apparent density of the laminate 4; and the physical properties of the substrate in the formed interior-finishing material. The flexural strength given in Table 1 was measured by the following method. A test piece was held by support members positioned 100 mm apart, pressure being applied to the middle of the test piece in the direction of its thickness, and the pressure immediately before the fracture of the test piece was recorded as the flexural strength. The moldability (i.e., mold-shape-following property) indicates the ability to follow the internal shape of the mold without leaving a gap, particularly at curved sections within the mold. The mark ⊚ indicates that excellent molding with a uniform thickness was obtained throughout the entire surface of the mold, including the complicated curving sections. The mark Δ indicates that gaps were created within the mold resulting in uneven molding conditions.

Concerning the property of adhesion to the surface material, the mark ⊚ indicates that good adhesiveness was obtained, the urethane foam not being removable when the urethane foam was forced to be removed, it was torn. The mark Δ indicates that apparent adhesiveness was obtained but that the urethane foam was easily removed from the surface of the substrate. The sound-absorption property (normal incident absorption rate) was measured by the method of JIS Aa1405. The higher value indicates a better absorption property.

COMPARATIVE EXAMPLE

The same procedure was repeated as in the Example, except that expandable microbeads were not used, that the weight of the emulsion used was changed as shown in Table 1, and that the mold clearance was set at 4.0 mm.

TABLE 1

| | | Units | Example | Comparative Example |
|---|---|---|---|---|
| Glass-fiber sheet | Glass fiber | g/m$^2$ | 495 | 495 |
| | Organic fiber | g/m$^2$ | 55 | 55 |
| Emulsion | Polystyrene-type emulsion (solid content) | parts by weight | 100 | 102 |
| | Acrylic-type emulsion (solid content) | parts by weight | 20 | 28 |
| | Expandable microbeads (solid content) | parts by weight | 10 | — |
| | Emulsion contained in substrate (solid content) | g/m$^2$ | 352 | 354 |
| Heat fusible adhesive | | g/m$^2$ | 50 | 50 |
| Dried laminate (substrate plus adhesive film) | Weight | g/m$^2$ | 952 | 954 |
| | Thickness | mm | 3.90 | 4.00 |
| | Apparent density | g/cm$^3$ | 0.244 | 0.238 |
| Various properties | Thickness of substrate | mm | 6.20 | 3.80 |

TABLE 1-continued

| | | Units | Example | Comparative Example |
|---|---|---|---|---|
| of internal-finishing material | Apparent density of substrate | g/cm³ | 0.153 | 0.251 |
| | Flexural strength (at room temperature) | kgf/50 mm | 2.55 | 1.50 |
| | Flexural strength (at 85° C.) | kgf/50 mm | 1.80 | 0.95 |
| | Moldability | — | ◉ | Δ |
| | Adhesiveness with surface material | — | ◉ | Δ |
| | Normal incident absorption rate  1,000 Hz | % | 62 | 43 |
| | 1,250 Hz | % | 64 | 56 |
| | 1,600 Hz | % | 72 | 70 |
| | 2,000 Hz | % | 88 | 83 |

In comparing the interior-finishing material obtained according to the present invention with that of the Comparative Example, it can be seen from Table 1 that the interior-finishing material according to the present invention is superior in the properties of flexural strength, moldability, adhesiveness to the surface material, and sound absorption.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. A method for producing an interior-finishing material for use in automobiles comprising the following successive steps of:

providing a needled glass-fiber sheet mainly composed of glass fiber;

dispersing a binder made of thermoplastic resin, and expandable microbeads into said needled glass-fiber sheet to obtain a substrate, said expandable microbeads being particles made of thermoplastic resin and containing an expanding agent, applying a heat-fusible adhesive layer in a striped or lattice pattern by being sprayed on the surface of the substrate, wherein the adhesive layer has overall air permeability; heating the two-layered laminate thus obtained by being expanding said expandable microbeads and to melt said binder and heat-fusible adhesive;

removing the heat and placing a surface material within air permeability on the surface of said adhesive layer while the adhesive layer remains melted and while the microbeads continue to expand; and subjecting the three-layered laminate thus obtained to cold compression molding while the microbeads complete their expansion, wherein the diameter of said expandable microbeads is less than 100 μm.

2. A method according to claim 1, wherein said thermoplastic resin binder is contained in an amount of from 20 to 80 parts by weight for every 100 parts by weight of said glass-fiber sheet, and said expandable microbeads are contained in an amount of from 2 to 50 parts by weight for every 100 parts by weight of said thermoplastic resin binder.

3. A method according to claim 1, wherein said needled glass-fiber sheet further contains organic fibers.

4. A method according to claim 1, wherein said expandable microbeads are thermal-expandable microcapsules.

5. A method according to claim 4, wherein said thermal-expandable microcapsules are made of vinylidene chloride copolymer in which an expanding agent is contained.

6. A method according to claim 5, wherein said expanding agent is selected from the group consisting of propane, butane, pentane, hexane, heptane and petroleum ether.

* * * * *